F. M. CAMPBELL.
BRAKE.
APPLICATION FILED SEPT. 13, 1918.
1,328,491.
Patented Jan. 20, 1920.
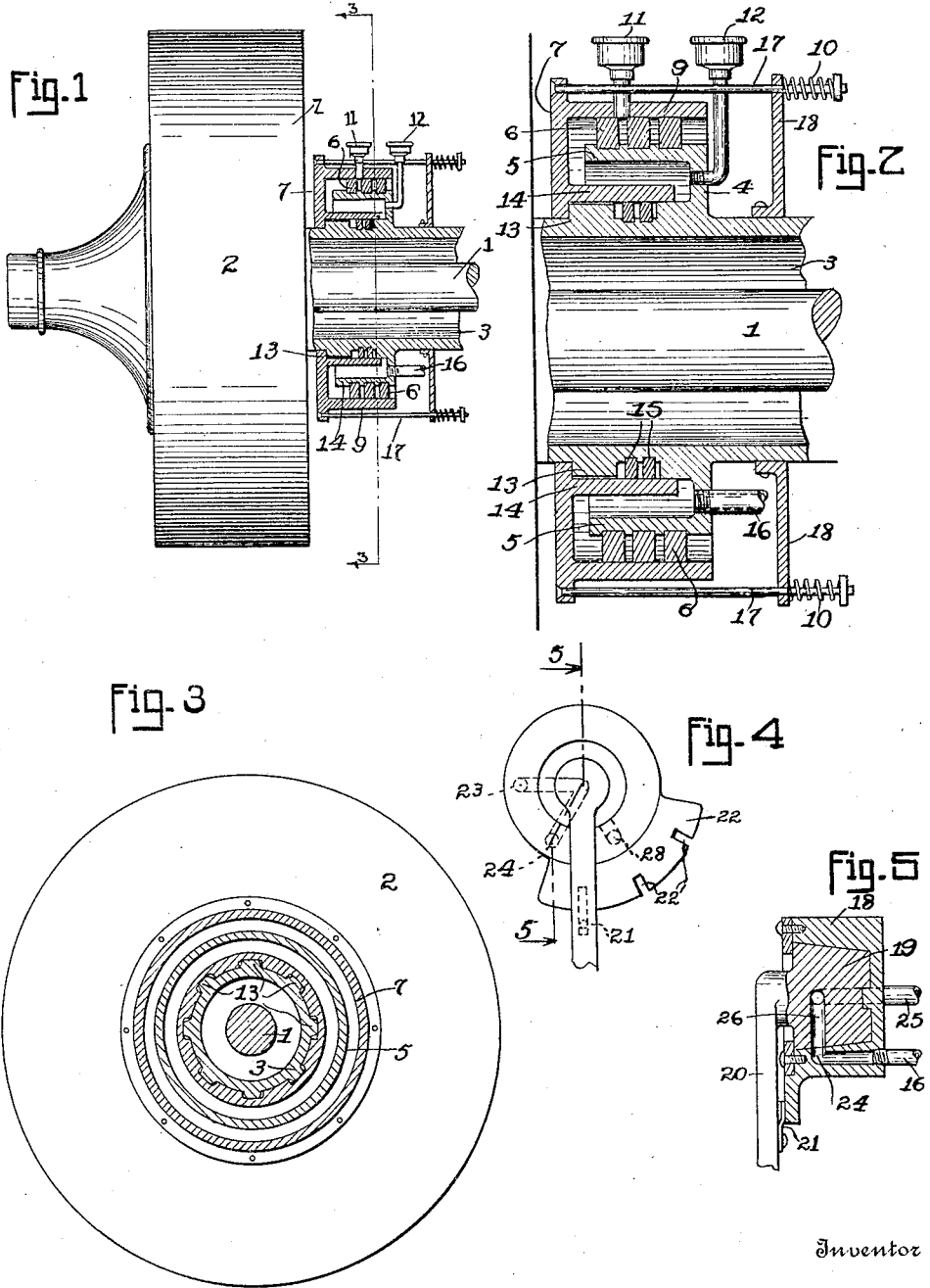
Inventor
FRANK M. CAMPBELL
By Henry L. Reynolds
Attorney

UNITED STATES PATENT OFFICE.

FRANK M. CAMPBELL, OF SOUTH BEND, WASHINGTON.

BRAKE.

1,328,491.             Specification of Letters Patent.      Patented Jan. 20, 1920.

Application filed September 13, 1918. Serial No. 253,879.

*To all whom it may concern:*

Be it known that I, FRANK M. CAMPBELL, a citizen of the United States, and resident of South Bend, county of Pacific, and State of Washington, have invented certain new and useful Improvements in Brakes, of which the following is a specification.

This invention relates to improvements in hub brakes for automobiles and has for one of its objects the provision of a device of this character, and also of a means whereby it may be readily and conveniently actuated by pneumatic means.

The invention consists in such novel features of construction, combination and arrangement of parts as will be hereinafter more fully described and claimed.

For a complete understanding of my invention reference is to be had to the following description and accompanying drawing, in which:

Figure 1 is a vertical sectional view of a brake constructed in accordance with my invention.

Fig. 2 is an enlarged fragmentary vertical sectional view of the same.

Fig. 3 is a transverse sectional view taken on the line 3—3 of Fig. 1.

Fig. 4 is a plan view of a controlling valve, and

Fig. 5 is a vertical sectional view of the same.

Referring in detail to the drawing, the numeral 1 indicates the axle of a vehicle having secured thereto the hub 2 of a wheel. The hub may be secured to the axle or journaled thereon as desired, and in any well known manner. The axle 1 is surrounded by an axle casing 3, integral with which or secured thereto, is a disk 4 and a cylindrical flange 5, the latter being outwardly spaced from the casing 3. The annular flange 5 is exteriorly provided with recesses in which are placed packing rings 6. A complemental annular flange 9 is fixed to a disk 7, which is journaled upon the axle casing 3. The annular flange 9 overlies the annular flange 5 and engages with the packing rings 6 to establish an air tight connection between the two rings 5 and 9, which have relative movement in an axial direction.

Rods 17 are connected to the movable member 7 and are free to move through a member 18 which is fixed to the axle casing 3. These rods have heads formed on their ends to be engaged by springs 10 which act to draw the movable member 7 and 9 in the direction of the stationary member 4. A suitable oil cup 11 is secured to the annular flange 9 and is adapted to furnish the packing rings 6 with lubricant. A similar oil cup 12 is secured to the disk of the stationary member 4 for furnishing the bearing surface of the outer member upon the axle casing with lubricant.

A plurality of lugs 13 are formed upon the exterior of the axle casing, extending lengthwise thereof, upon which is slidably mounted an annular flange 14 formed upon the disk 7 within the annular flange 5 of the inner member 4. Packing rings 15 are disposed between the axle casing 3 and the annular flange 14 to prevent the escape of air. An air supply pipe 16, leading from a source of supply of air under pressure, is connected to the disk portion of the inner stationary member 5, for admitting air within the space occurring between the inner and outer members for forcing the outer member against the face of the hub 2 to retard the speed of the same.

A controlling valve consists of a casing 18 having journaled therein a valve body 19 to which is secured a controlling lever 20. The controlling lever 20 has secured thereto a spring 21 which rides upon a quadrant 22 provided with a plurality of relatively spaced notches 22′ that receive the spring 21 for holding the controlling lever 20 in various positions against accidental movement.

The casing has ports 23, 24 and 28 therein, equally spaced apart and the valve body 19 has a passage or port 26 having its ends spaced to register at the same time with two of the ports 23, 24 and 28. By properly placing the valve the port 26 may connect the central port 24 of the casing with either port 23 or 28. The port 23 receives air under pressure from pipe 25 and the port 24 connects, through pipe 16, with the brake mechanism, while the port 28 is an exhaust port. It is evident that when port 24 is connected with port 23, air under pressure is supplied to the brake, while when port 24 is connected with port 28, the air is discharged from the brake mechanism.

To insure a proper placing of the valve body to secure registry of the ports, I have provided a flange 22 having recesses 22′ with which the spring 21 may engage. In operation, when the brake is off the controlling lever occupies the intermediate notch 22' and when it is desired to apply the brake, the lever is moved to occupy the position as illustrated in full lines in Fig. 4, causing the passage 26 to register with the ports 23 and 24, admitting air to the brake, forcing the member 7 against the wheel. When it is desired to release the brake, the lever is moved to the other end notch 22' in the quadrant 22 causing the passage 26 to connect the passage 24 and the outlet port 28, thus permitting the air within the brake to escape, the brake being then moved to its normal position under the influence of the springs.

While I have shown and described the preferred embodiment of my invention, it will be understood that minor changes in construction, combination and arrangement of parts may be made without departing from the spirit and scope of the invention as claimed.

What I claim as my invention is:

1. A pneumatic vehicle brake comprising a member fixed relative to the vehicle and having a central hub surrounding the axle next to a wheel, said hub having external, axially extending ribs and peripheral recesses for the reception of packing rings, said fixed member also having an outwardly spaced cylindrical flange also provided with packing-ring-receiving grooves, packing rings in each set of grooves, a braking disk having two cylindrical flanges fitting each upon its respective packing rings, the inner of said flanges having axially extending ribs meshing with the ribs of the fixed member, springs normally drawing said two members together, and means for supplying air under pressure to the space inclosed between the said members.

2. A pneumatic vehicle brake comprising a member fixed relative to the vehicle and having a central hub surrounding the axle next to a wheel, said hub having external, axially extending ribs and peripheral recesses for the reception of packing rings, said fixed member also having an outwardly spaced cylindrical flange also provided with packing-ring-receiving grooves, packing rings in each set of grooves, a braking disk having two cylindrical flanges fitting each upon its respective packing rings, the inner of said flanges having axially extending ribs meshing with the ribs of the fixed member, rods connecting both said members, springs surrounding said rods and acting to draw said members together, and means for supplying air under pressure to the space between said two members.

Signed at South Bend, Washington, this 17th day of August, 1918.

FRANK M. CAMPBELL.